Patented Mar. 5, 1929.

1,703,948

UNITED STATES PATENT OFFICE.

HEINRICH NERESHEIMER, OF LUDWIGSHAFEN-ON-THE-RHINE, GERMANY, ASSIGNOR TO GRASSELLI DYESTUFF CORPORATION, OF NEW YORK, N. Y., A CORPORATION OF DELAWARE.

VAT DYESTUFF.

No Drawing. Application filed December 22, 1927, Serial No. 242,017, and in Germany December 23, 1926.

I have found that new and valuable vat dyestuffs of the pyranthrone series are obtained when the Bz.Bz'-diarylpyranthrones described in German Patent No. 278,424 are treated with acid condensing agents and simultaneously or subsequently with oxidizing agents. If oxidizing agents, for example manganese dioxid, are used simultaneously with the condensing agents, the reaction, in the simplest case, probably takes place according to the scheme

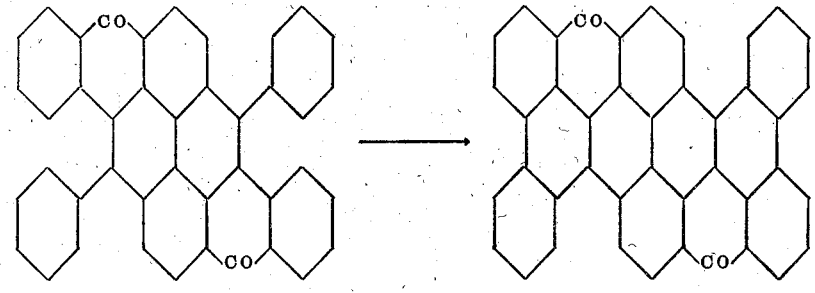

If acid condensing agents alone, such as aluminum chlorid are used, the same substance is obtained first in a condition of reduction product which is readily oxidized to the dyestuff itself by contact with air, already in the course of preparation. The new dyestuffs differ from the Bz.Bz'-diarylpyranthrones, chiefly by possessing generally speaking a more reddish tinge.

The following examples will further illustrate how the said invention may be carried out in practice but the invention is not limited thereto. The parts are by weight.

Example 1.

A solution of 10 parts of Bz.Bz'-diphenylpyranthrone in 100 parts of concentrated sulfuric acid, is treated with a suspension of 6 parts of artificial manganese dioxid containing about 55 per cent of $MnO_2$ in 100 parts of concentrated sulfuric acid, the mixture being well cooled, and stirred until the initially reddish blue colour of the solution has changed to a pure green. The mixture is then poured into water, and the resulting dyestuff of which an excellent yield is obtained, is treated in the usual manner, and if necessary, purified by treatment with sodium hypochlorite solution. It forms a reddish-orange powder which dissolves to a green solution in concentrated sulfurc acid. Brilliant orange dyeings, of good fastness, are obtained from the green alkaline hydrosulfite vat.

Example 2.

40 parts of aluminium chlorid and 10 parts of common salt are fused at 140° centigrade, and 10 parts of Bz.Bz'-diphenylpyranthrone are introduced into the mixture. The hydro-compound of the new dyestuff forms in a short time, and undergoes partial conversion into the dyestuff, through contact with the air, already in the course of preparation, complete conversion being effected by aeration. The product is identical, in chemical and tinctorial properties, with that of Example 1.

In a similar manner as described in the foregoing examples, other Bz.Bz'-diarylpyranthrones can be converted into new vat dyestuffs.

What I claim is:

1. As new articles of manufacture new vat dyestuffs of the pyranthrone series corresponding probably to the general formula

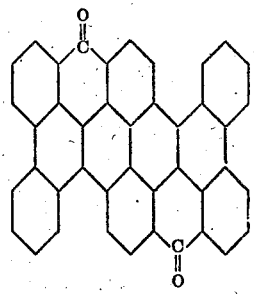

which dye vegetable fibres yellow red shades of good fastness from a greenish alkaline hydrosulfite vat, dissolve to a greenish solution in concentrated sulfuric acid and are obtainable by treating a Bz.Bz'-diarylpyranthrone with an acid condensing agent and with an oxidizing agent.

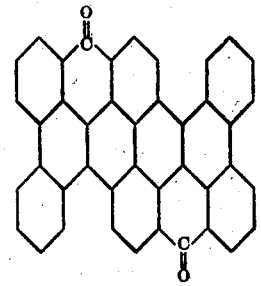

which dye yellow red shades of good fastness on vegetable fibres from a greenish alkaline hydrosulfite vat, and dissolve to a greenish solution in concentrated sulfuric acid and are obtainable by treating a Bz.Bz'-diphenylpyranthrone with an acid condensing agent and with an oxidizing agent.

2. As new articles of manufacture new vat dyestuffs of the pyranthrone series corresponding probably to the general formula 3. As a new article of manufacture the new vat dyestuff of the pyranthrone series corresponding probably to the formula

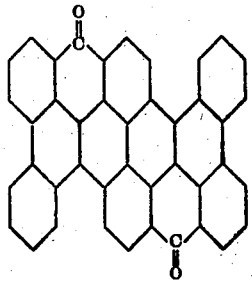

which dyes vegetable fibres brilliant orange shades of good fastness from a green alkaline hydrosulfite vat, dissolves to a green solution in concentrated sulfuric acid and is obtainable by treating Bz.Bz'-diphenylpyranthrone with an acid condensing agent and an oxidizing agent.

4. A process for the production of new vat dyestuffs of the pyranthrone series which consists in treating a Bz.Bz'-diarylpyranthrone with an acid condensing agent and an oxidizing agent.

5. A process for the production of new vat dyestuffs of the pyranthrone series which consists in treating a Bz.Bz'-diphenylpyranthrone with an acid condensing agent and an oxidizing agent.

6. A process for the production of a new vat dyestuff of the pyranthrone series which consists in treating Bz.Bz'-diphenylpyranthrone with an acid condensing agent and an oxidizing agent.

7. A process for the production of a new vat dyestuff of the pyranthrone series which consists in treating Bz.Bz'-diphenylpyranthrone with sulfuric acid and manganese dioxid.

In testimony whereof I have hereunto set my hand.

HEINRICH NERESHEIMER.